(12) United States Patent
Hoshiya

(10) Patent No.: US 11,208,112 B2
(45) Date of Patent: Dec. 28, 2021

(54) DRIVE FORCE CONTROL SYSTEM FOR VEHICLE

(71) Applicant: TOYOTA JIDOSHA KABUSHIKI KAISHA, Toyota (JP)

(72) Inventor: Kazumi Hoshiya, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 274 days.

(21) Appl. No.: 16/594,198

(22) Filed: Oct. 7, 2019

(65) Prior Publication Data

US 2020/0139986 A1 May 7, 2020

(30) Foreign Application Priority Data

Nov. 7, 2018 (JP) .............................. JP2018-209386

(51) Int. Cl.
*B60W 50/038* (2012.01)
*B60W 30/02* (2012.01)
*H02K 7/00* (2006.01)
*H02P 5/747* (2006.01)

(52) U.S. Cl.
CPC ........ *B60W 50/038* (2013.01); *B60W 30/025* (2013.01); *H02K 7/006* (2013.01); *H02P 5/747* (2013.01); *B60W 2510/084* (2013.01); *B60W 2710/085* (2013.01)

(58) Field of Classification Search
CPC ............. B60W 50/038; B60W 30/025; B60W 2710/085; B60W 2510/084; B60W 10/06; B60W 10/08; B60W 2710/083; B60W 2720/106; B60W 2520/10; B60W 2540/10; B60W 2510/244; B60W 20/19; B60W 20/11; B60W 10/26; B60W 10/10; B60W 20/00; B60W 2510/083; B60W 2510/0657; H02K 7/006; H02P 5/747; B60K 6/445; Y02T 90/14; Y02T 10/7072; Y02T 10/70; Y02T 10/72; Y02T 10/62
See application file for complete search history.

(56) References Cited

U.S. PATENT DOCUMENTS

| | | | |
|---|---|---|---|
| 2004/0049328 A1* | 3/2004 | Lee | B60L 15/10 701/22 |
| 2016/0341138 A1* | 11/2016 | Yagi | F02D 41/10 |
| 2017/0059035 A1* | 3/2017 | Okamura | F16H 61/04 |
| 2018/0297600 A1* | 10/2018 | Kitagawa | B60W 30/19 |
| 2020/0114901 A1* | 4/2020 | Oyama | B60K 6/48 |

FOREIGN PATENT DOCUMENTS

| | | |
|---|---|---|
| JP | 2015-079369 A | 4/2015 |
| JP | 2017-129160 A | 7/2017 |

* cited by examiner

*Primary Examiner* — Joseph J Dallo
*Assistant Examiner* — Scott A Reinbold
(74) *Attorney, Agent, or Firm* — Oliff PLC

(57) ABSTRACT

A drive force control system for a vehicle having a motor and a battery that allows a driver to sense a satisfactory acceleration even if an output torque of a motor is restricted. The drive force control system comprises a controller that calculates an upper limit acceleration of the vehicle based on an upper limit power to be supplied from the battery to the motor. The controller sets a reference jerk as the required jerk when the upper limit acceleration is equal to or greater than the target acceleration, and sets a corrected jerk that is greater than the reference jerk as the required jerk when the upper limit acceleration is less than the target acceleration.

7 Claims, 6 Drawing Sheets

DRIVE FORCE CONTROL SYSTEM FOR VEHICLE

CROSS REFERENCE TO RELATED APPLICATIONS

The present invention claims the benefit of priority to Japanese Patent Application No. 2018-209386 filed on Nov. 7, 2018 with the Japanese Patent Office, the entire contents of which are incorporated herein by reference in its entirety.

BACKGROUND

Field of the Invention

Embodiments of the present disclosure relates to the art of a drive force control system for controlling a drive force of a vehicle including a motor as a prime mover during accelerating the vehicle.

Discussion of the Related Art

JP-A-2017-129160 describes a drive force control system for a vehicle having an engine and a geared transmission in which a plurality of gear stages can be selected. The drive force control system taught by JP-A-2017-129160 comprises an evaluation map for evaluating an acceleration feel of a driver based on a stimulation intensity as a product of a change in an acceleration and a jerk until achieving the target acceleration, and a plateau period from a point at which an accelerating operation is started to a point at which the driver starts feeling a change in the acceleration. The drive force control system is configured to control an engine torque, and execute a downshifting with reference to the evaluation map. According to the teachings of JP-A-2017-129160, the drive force control system calculates a change amount of the acceleration based on the acceleration established by operating an accelerator, and calculates a target jerk possible to improve the acceleration feel based on the change amount of the acceleration and the aforementioned plateau period. Then, downshift lines in a shift map and an opening degree of throttle valve with respect to an accelerator position are controlled in such a manner as to achieve the target jerk.

JP-A-2015-79369 describes a driving assisting device for assisting a drive force to propel a vehicle. According to the teachings of JP-A-2015-79369, in a case that a driving time in a constant speed travel section is longer than a predetermined period, the driving assisting device accelerate the vehicle at a predetermined acceleration in an initial phase to travel in the constant speed travel section. Then, in order to reduce uncomfortable feeling of a driver of a following vehicle, the driving assisting device propels the vehicle at a constant speed within a period longer than the predetermined period, and decelerate the vehicle at a predetermined deceleration. Given that the driving assisting device taught by JP-A-2015-79369 is applied to an electric vehicle, the driving assisting device inhibits to accelerate and decelerate the electric vehicle, or reduces acceleration and deceleration of the electric vehicle, when a state of charge level of a battery is lower than a predetermined level.

As described, the drive force control system taught by JP-A-2017-129160 is configured to calculate the target jerk with reference to the evaluation map, based on the change in the acceleration until achieving the target acceleration and the plateau period of the acceleration. However, an output torque of the motor serving as a prime mover is restricted depending on a state of charge level of the battery, and temperatures of the battery and the motor. In this situation, the target acceleration may not be achieved if the target acceleration is greater than the acceleration possible to be generated by the motor whose output torque is restricted. In this situation, therefore, stimulation intensity governed by the change in the acceleration and the jerk will be reduced, and hence the driver is not allowed to feel satisfactory acceleration.

SUMMARY

Aspects of preferred embodiments of the present application have been conceived noting the foregoing technical problems, and it is therefore an object of the present application to provide a drive force control system for a vehicle that allows a driver to sense a satisfactory acceleration even if an output torque of a motor is restricted.

The drive force control system according to the embodiment of the present disclosure is applied to a vehicle having a motor serving as a prime mover, and an electric storage device that supplies electric power to the motor. In order to achieve the above-explained objective, according to the embodiment of the present disclosure, the drive force control system is provided with a controller that controls an output torque of the motor to achieve a required jerk. The controller is configured to: calculate an upper limit acceleration possible to be established to accelerate the vehicle based on an upper limit electric power possible to be supplied from the electric storage device to the motor; set a predetermined reference jerk as the required jerk when the upper limit acceleration is equal to or greater than a target acceleration; and set a corrected jerk that is greater than the reference jerk as the required jerk when the upper limit acceleration is less than the target acceleration.

In a non-limiting embodiment, the controller may be further configured to: set the corrected jerk in such a manner that a required stimulation intensity and a reference stimulation intensity are equalized to each other; calculate the required stimulation intensity by multiplying acceleration parameter using a change amount of acceleration from a point at which the vehicle is accelerated to a point at which the acceleration reaches the upper limit acceleration, by a jerk parameter using the corrected jerk as a parameter; and calculate the reference stimulation intensity by multiplying another acceleration parameter using a change amount of the acceleration from the point at which the vehicle is accelerated to a point at which the acceleration reaches the target acceleration, by another jerk parameter using the reference jerk as a parameter.

In a non-limiting embodiment, the controller may be further configured to correct the corrected jerk in such a manner that the required stimulation intensity is reduced smaller than the reference stimulation intensity, when the corrected jerk is greater than a predetermined upper limit jerk.

In a non-limiting embodiment, the controller may be further configured to correct the corrected jerk less than the upper limit jerk.

In a non-limiting embodiment, the controller may be further configured to correct the corrected jerk to the reference jerk.

In a non-limiting embodiment, the upper limit electric power may vary depending on a state of charge level of the electric storage device, and the controller may be further configured to notify a driver of the vehicle to operate the vehicle in such a manner as to charge the electric storage device.

In a non-limiting embodiment, the prime mover may include an engine, and the upper limit acceleration may include an acceleration achieved by generating a maximum torque by the engine while generating a maximum torque by the motor.

Thus, when the electric power of the electric storage device supplied the motor is restricted, the drive force control system according to the embodiments of the present disclosure calculate the upper limit acceleration based on the upper limit power supplied from the electric storage device to the motor. If the upper limit acceleration is equal to or greater than the target acceleration, the drive force control system sets the reference jerk as the required jerk. By contrast, if the upper limit acceleration is less than the target acceleration, the drive force control system sets the corrected jerk that is greater than the reference jerk as the required jerk. According to the embodiment of the present disclosure, therefore, reduction in the acceleration feeling can be prevented by increasing the jerk even if the acceleration to be achieved is less than the target acceleration.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Embodiment of the present disclosure will now be explained with reference to the accompanying drawings. The drive force control system according to the embodiment of the present disclosure is applied to vehicles having a motor serving as a prime mover. For example, the drive force control system according to the embodiment of the present disclosure may be applied to: an electric vehicle that is powered only by a motor; a series hybrid vehicle in which a power of an engine is translated into an electric power by a generator, and a motor is operated to propel the vehicle by the electricity thus translated and electricity supplied from a battery; a parallel hybrid vehicle propelled by delivering powers of an engine and an motor to wheels; and a series-parallel hybrid vehicle that is propelled by an output power of a motor operated by electric power translated from a part of an output power of an engine, and the output power of the engine delivered mechanically to wheels.

Figure 1:
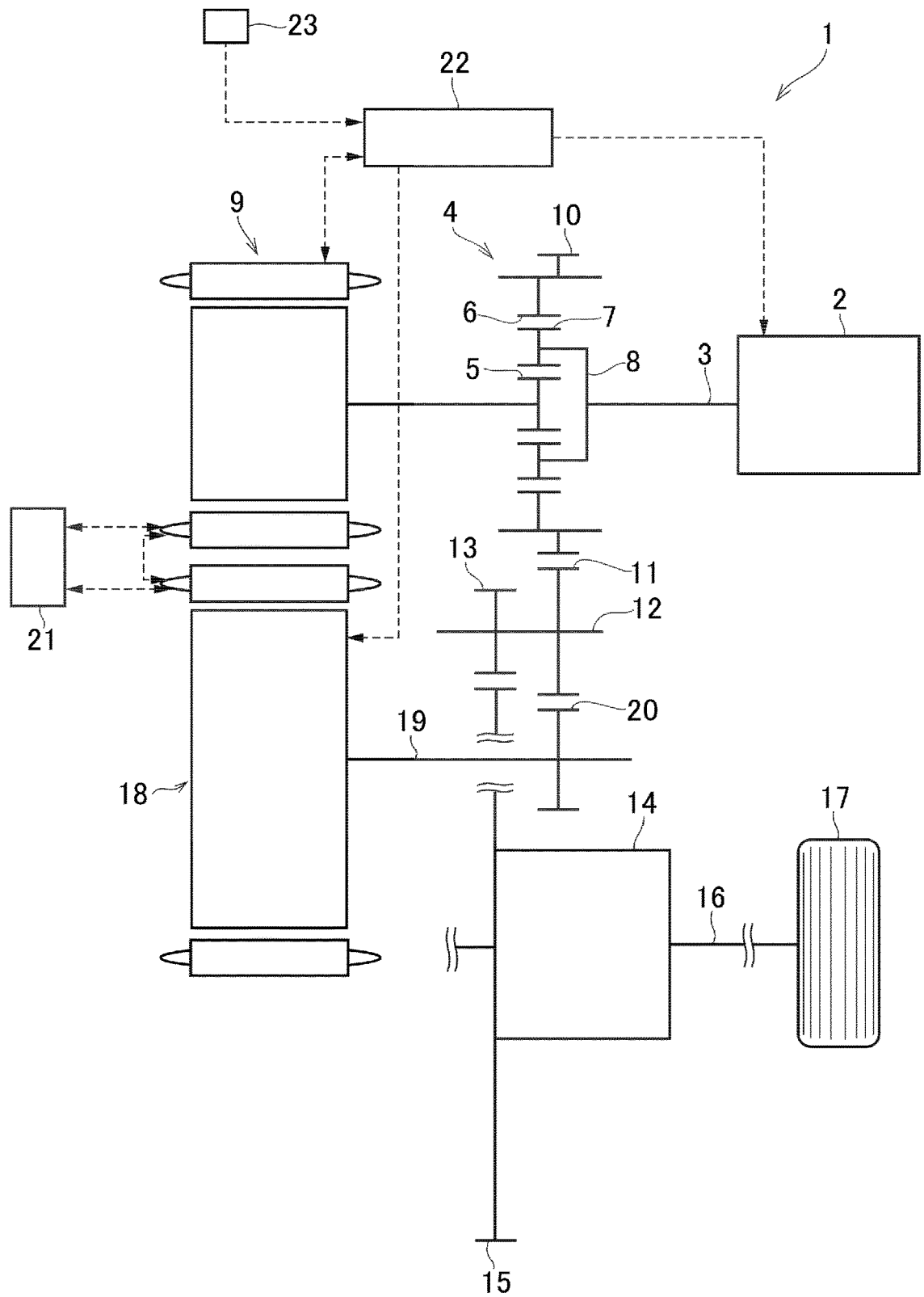
FIG. 1 is a schematic illustration showing one example of a structure of a vehicle to which the drive force control system according to the embodiment of the present disclosure is applied.

Referring now to FIG. 1, there is shown one example of a structure of a hybrid vehicle (as will be simply called the "vehicle" hereinafter) 1 to which the drive force control system according to the embodiment is applied. The vehicle 1 is provided with an engine 2 as a prime mover. For example, a gasoline engine and a diesel engine may be adopted as the engine 2.

A power split mechanism 4 is connected to an output shaft 3 of the engine 2 so that an output torque of the engine 2 is distributed to a first motor 9 and drive wheels 17. In the example shown in FIG. 1, a single-pinion planetary gear unit is employed as the power split mechanism 4. Specifically, the power split mechanism 4 comprises a sun gear 5, a ring gear 6 as an internal gear that is arranged concentrically with the sun gear 5, a plurality of planetary gears 7 interposed between the sun gear 5 and the ring gear 6, and a carrier 8 supporting the planetary gears 7 in a rotatable manner.

The first motor 9 is connected to the sun gear 5, and the engine 2 is connected to the carrier 8. For example, a motor-generator such as a permanent magnet synchronous motor may be adopted as the first motor 9, and the output torque of the engine 2 is distributed to the first motor 9 (or the sun gear 5) and the drive wheels 17 (or the ring gear 6) by establishing a reaction torque by the first motor 9.

An output gear 10 as an external gear is formed on an outer circumferential face of the ring gear 6. A driven gear 11 is fitted onto one end of a countershaft 12 extending parallel to the output shaft 3 of the engine 2 to be meshed with the output gear 10, and a drive gear 13 is fitted onto the other end of the countershaft 12 to be meshed with a ring gear 15 of a differential gear unit 14. The torque delivered to differential gear unit 14 is distributed to the pair of drive wheels 17 through each driveshaft 16.

A second motor 18 serving as the "motor" of the exemplary embodiment is arranged in such a manner that an output shaft (or a rotor shaft) 19 thereof extends parallel to the output shaft 3 of the engine 2 and the countershaft 12, and a reduction gear 20 is fitted onto an end portion of the output shaft 19 of the second motor 18 to be meshed with the driven gear 11. A motor-generator such as a permanent magnet synchronous motor may also be adopted as the second motor 18.

The first motor 9 and the second motor 18 are connected to each other so that electricity generated by one of the first motor 9 and the second motor 18 is supplied to the other one of the first motor 9 and the second motor 18. The first motor 9 and the second motor 18 are also connected individually to an electric storage device 21 so that electricity generated by the first motor 9 and the second motor 18 is accumulated in the electric storage device 21, and the electricity accumulated in the electric storage device 21 is supplied to the first motor 9 and the second motor 18.

In order to control the engine 2, the first motor 9, the second motor 18 and so on, the vehicle 1 is further provided with an electronic control unit (to be abbreviated as the "ECU" hereinafter) 22 as a controller comprising a microcomputer as its main constituent. The ECU 22 is configured to determine target speeds and target torques of the engine 2, the first motor 9, and the second motor 18 based on the incident signals and formulas as well as maps installed in the ECU 22, and transmits command signals to the engine 2, the first motor 9, and the second motor 18 to achieve the target speeds and the target torques. To this end, detection signals are transmitted to the ECU 22 from a sensor 23 including: an accelerator sensor that detects an operating amount of an accelerator pedal; a vehicle speed sensor that detects a speed of the vehicle 1; an engine speed sensor that detects a speed of the engine 2; a first motor speed sensor that detects a speed of the first motor 9; a second motor speed sensor that detects a speed of the second motor 18; a first motor temperature sensor that detects a temperature of the first motor 9; a second motor temperature sensor that detects a temperature of the second motor 18; a battery sensor that detects a state of charge (to be abbreviated as "SOC" hereinafter) level and an output voltage of the electric storage device 21; a battery temperature sensor that detects a temperature of the electric storage device 21, and so on (neither of which are shown).

An operating mode of the vehicle 1 may be selected at least from: a hybrid mode (to be abbreviated as the "HV mode" hereinafter) in which a required power governed by a position of an accelerator pedal is generated by the engine 2 at least partially, and an electric vehicle mode (to be abbreviated as the "EV mode" hereinafter) in which the required power is generated by the second motor 18.

In the HV mode, the first motor 9 generates a reaction torque to deliver the output torque of the engine 2 to the drive wheels 17. During propulsion in the HV mode, a target speed of the engine 2 is calculated taking account of a required power of the engine 2 and a fuel consumption, and a speed of the first motor 9 is controlled based on the target speed of the engine 2 and a speed of the vehicle 1. In this situation, the first motor 9 serves not only as a motor but also as a generator depending on a rotational direction. In the HV mode, when an output power to propel the output gear 10 is less than a required power of the vehicle 1, the second motor 18 is operated as a motor and an output power of the second motor 18 is synthesized with the output power of the output gear 10 at the driven gear 11. By contrast, when the output power of the output gear 10 is greater than the required power to propel the vehicle 1, the second motor 18 is operated as a generator to translate an excessive power into an electric power at the driven gear 11.

In the HV mode, the maximum drive force to establish the maximum possible acceleration is generated by adjusting a speed of the engine 2 in such a manner as to maximize an output torque of the engine 2, while generating a power by the second motor 18 in such a manner that a power balance between the first motor 9 and the second motor 18 is adjusted to allow the electric storage device 21 to discharge an upper limit power. In other words, if the output power of the electric storage device 21 is restricted, the acceleration possible to be established will be restricted. The output power of the electric storage device 21 may also be restricted depending on the temperatures of the first motor 9 and the second motor 18. The following example will be explained based on an assumption that the second motor 18 is operated as a motor, for the sake of convenience.

In the EV mode, it is not necessary to generate power to propel the vehicle 1 by the engine 2 and the first motor 9. In the EV mode, therefore, fuel supply to the engine 2 and power supply to the first motor 9 are stopped, and the second motor 18 is operated as a motor to generate power to propel the vehicle 1. Accordingly, in the EV mode, the maximum drive force to establish the maximum possible acceleration is generated by operating the second motor 18 as a motor while supplying the maximum possible power of the electric storage device 21 to the second motor 18. In other words, if the output power of the electric storage device 21 is restricted, the acceleration possible to be established will also be restricted. The output power of the electric storage device 21 may be restricted depending on the temperatures of the first motor 9 and the second motor 18 also in the EV mode.

Figure 2:
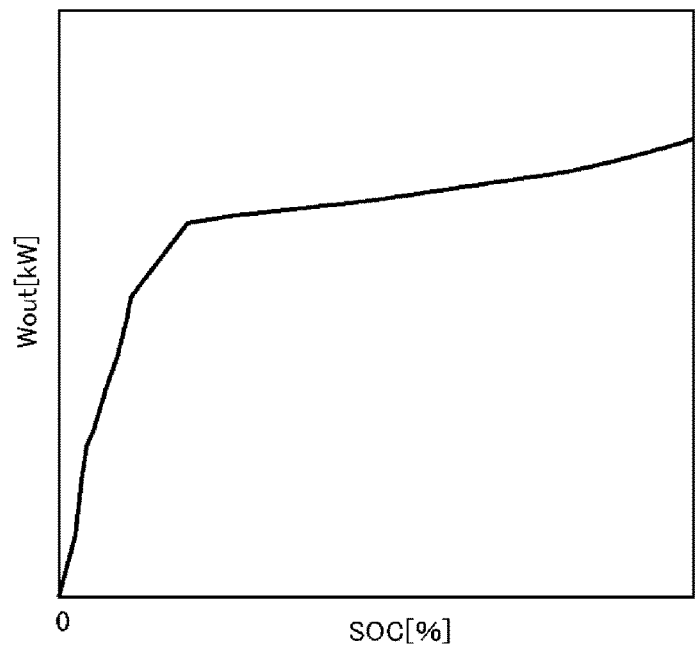
FIG. 2 is a graph indicating a relation between an output power and a state of charge level of the electric storage device.

Here will be briefly explained such restriction of the output power from the electric storage device 21. Turning to FIG. 2, there is shown a relation between an SOC level of the electric storage device 21 and a possible output power (Wout) from the electric storage device 21. As can be seen from FIG. 2, the output power of the electric storage device 21 is reduced with a lowering of the SOC level. That is, an output power of the second motor 18 is reduced with a reduction in the SOC level of the electric storage device 21.

Figure 3:
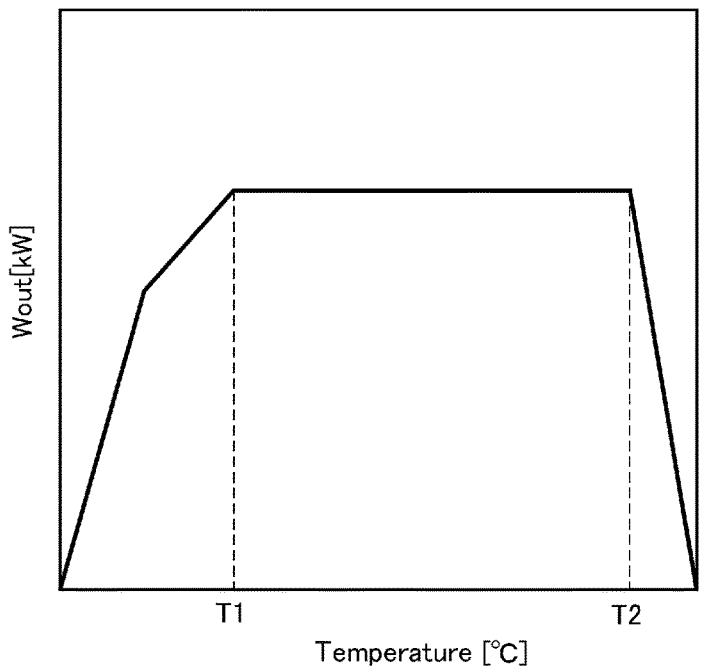
FIG. 3 is a graph indicating a relation between an output power and a temperature of the electric storage device.

On the other hand, FIG. 3 shows a relation between a temperature of the electric storage device 21 and the possible output power (Wout) from the electric storage device 21. As can be seen from FIG. 3, the output power of the electric storage device 21 is restricted if the temperature of the electric storage device 21 is lower than a predetermined level T1. That is, if the temperature of the electric storage device 21 is lower than the predetermined level T1, an internal resistance in the electric storage device 21 is increased and hence the output power of the electric storage device 21 is restricted. In order to limit a thermal damage on the electric storage device 21, the output power of the electric storage device 21 is also restricted if the temperature of the electric storage device 21 is higher than a predetermined level T2. Thus, the output power of the electric storage device 21 is restricted depending on a temperature of the electric storage device 21. In addition, an output power of the second motor 18 is also restricted depending on a temperature of the second motor 18 itself, a temperature of an electric circuit connecting the electric storage device 21 to the second motor 18 and so on.

Figure 4:
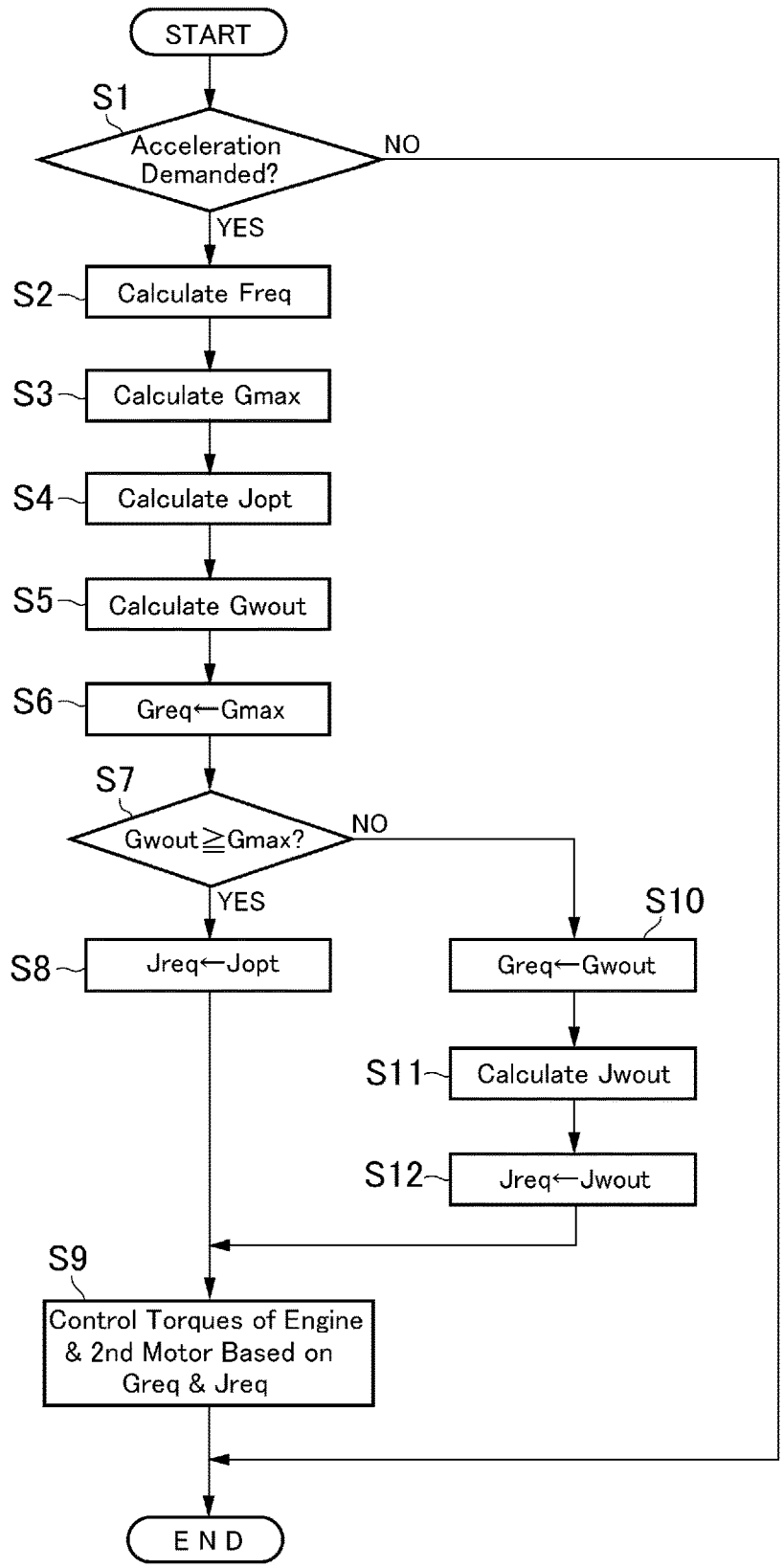
FIG. 4 is a flowchart showing one example of a routine executed by the drive force control system according to the embodiment of the present disclosure.

The drive force control system according to the embodiment of the present disclosure is configured to prevent an excessive reduction in an acceleration feeling even if an actual acceleration cannot be increased to a target acceleration. To this end, the drive force control system according to the embodiment of the present disclosure executes a routine shown in FIG. 4.

At step S1, it is determined whether the driver intends to accelerate the vehicle 1. In other words, it is determined whether the accelerator pedal is depressed by the driver to accelerate the vehicle 1. For example, such determination at step S1 may be made based on a fact that an operating amount of the accelerator pedal is greater than a predetermined value. Optionally, an operating speed of the accelerator may also be employed as a parameter to determine whether the driver intends to accelerate the vehicle 1, in addition to a position or an operating amount of the accelerator pedal.

If the driver does not intend to accelerate the vehicle 1 so that the answer of step S1 is NO, the routine returns. By contrast, if the driver intends to accelerate the vehicle 1 so that the answer of step S1 is YES, the routine progresses to step S2 to calculate a required drive force Freq based on a position of the accelerator pedal and a speed of the vehicle 1.

Figure 5:
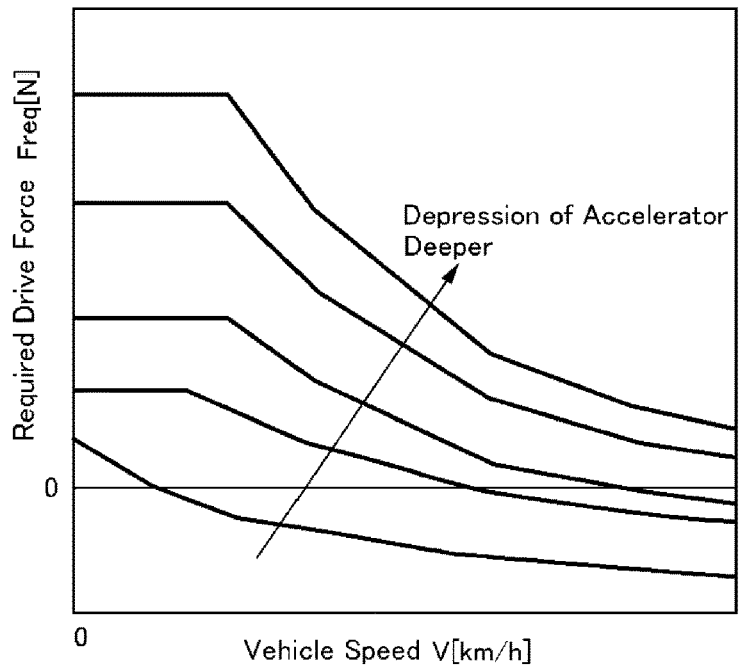
FIG. 5 is a map for calculating the required drive force.

An example of a map for calculating the required drive force Freq is shown in FIG. 5, and the map shown in FIG. 5 is installed in the ECU 22. In FIG. 5, the horizontal axis represents a speed of the vehicle 1, the vertical axis represents a required drive force, and each curve indicates a required drive force with respect to a position of the accelerator pedal. At step S2, specifically, the required drive force Freq is calculated based on a current speed of the vehicle 1 detected by the vehicle speed sensor and a position of the accelerator pedal detected by the accelerator sensor, with reference to the above-explained map.

Then, at step S3, an expected acceleration Gmax as a target acceleration possible to be established by generating the required drive force Freq is calculated using the following formula:

$$Gmax=(Freq-Fload)/W \qquad (1)$$

where Fload is a running resistance, and W is a total weight of the vehicle 1. Specifically, the running resistance Fload is a load against a propulsion force of the vehicle 1 such as an air resistance, and is calculated based on the speed of the vehicle 1. For example, the total weight W of the vehicle 1 may be obtained based on a displacement of a suspension. Alternatively, the expected acceleration Gmax may also be calculated based on an assumption that the vehicle 1 carries a predetermined load.

Figure 6:
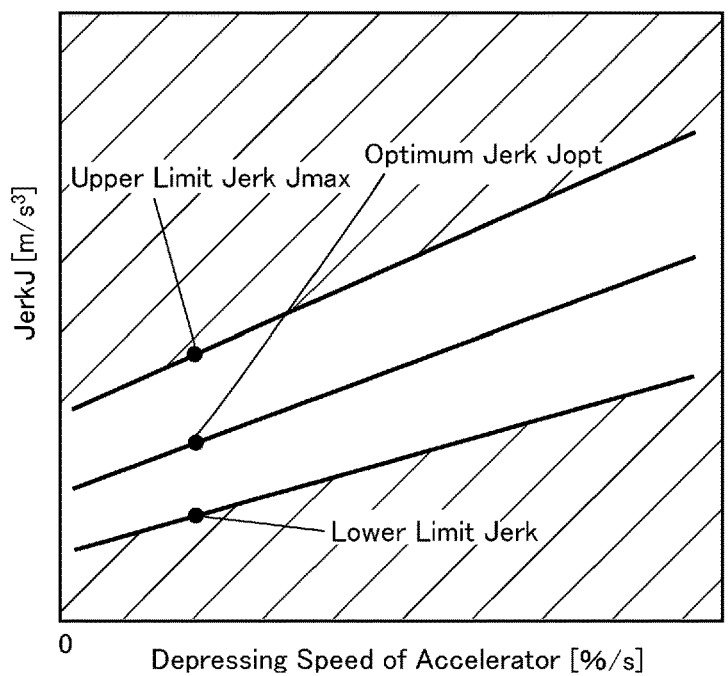
FIG. 6 is a graph indicating a relation between a depressing speed of an accelerator pedal and an optimum jerk.

Then, at step S4, an optimum jerk Jopt as a reference jerk is calculated based on a depressing speed of the accelerator pedal with reference e.g., to a map shown in FIG. 6. In FIG. 6, the horizontal axis represents a depressing speed of the accelerator pedal, and the vertical axis represents a jerk. As can be seen from FIG. 6, the optimum jerk Jopt is increased in proportion to an increase in the depressing speed of the accelerator pedal. That is, when the driver intends to accelerate the vehicle 1 abruptly, the driver depresses the accelerator pedal at a high speed, therefore, the optimum jerk Jopt is increased with an increase in the depressing speed of the accelerator pedal. Alternatively, the optimum jerk Jopt may also be increased in a quadratic manner with respect to an increase in the depressing speed of the accelerator pedal.

In addition, an acceptable upper limit jerk Jmax and an acceptable lower limit jerk Jmin are indicated in FIG. 6. Specifically, the upper limit jerk Jmax is an acceptable upper limit value of an actual jerk which is greater than a jerk intended by the driver, and the lower limit jerk Jmin is an acceptable lower limit value of the actual jerk which is less than the jerk intended by the driver. In FIG. 6, a hatched area above the line indicating the upper limit jerk Jmax is an area where the actual jerk is greater than the upper limit jerk Jmax, and a hatched area below the line indicating the lower limit jerk Jmin is an area where the actual jerk is less than the lower limit jerk Jmin.

Then, at step S5, an actual possible acceleration Gwout as an upper limit acceleration possible to be established is calculated based on a power possible to be generated by the second motor 18 and a speed of the vehicle 1, using the following formula:

$$Gwout = \left[ \left\{ \frac{Wout \cdot 1000 \cdot \eta m}{V \cdot \frac{1000}{3600} \cdot \frac{1}{2\pi Rt} \cdot 2\pi} + (Tmax \cdot \gamma \cdot \eta e) \right\} \cdot \frac{1}{Rt} - Fload \right] \cdot \frac{1}{W} \qquad (2)$$

where Wout is an upper limit electric power possible to be supplied from the electric storage device 21 to the second motor 18, V is a speed of the vehicle 1, Rt is a radius of a tire, Tmax is a maximum torque of the engine 2, γ is an amplification factor of the torque transmitted from the engine 2 to the drive wheel 17, ηm is a motor efficiency calculated by dividing a power transmitted from the second motor 18 to the drive wheel 17 by an electric power supplied to the second motor 18, and ηe is a transmission efficiency calculated by dividing a power transmitted from the engine 2 to the drive wheel 17 by an output power of the engine 2.

Then, at step S6, the expected acceleration Gmax calculated at step S3 is set as a required acceleration Greq. Thereafter, at step S7, it is determined whether the upper limit acceleration Gwout calculated at step S5 is equal to or greater than the expected acceleration Gmax. In other words, at step S7, it is determined whether the required drive force Freq can be generated.

If the upper limit acceleration Gwout is equal to or greater than the expected acceleration Gmax so that the answer of step S7 is YES, the routine progresses to step S8 to set the optimum jerk Jopt calculated at step S4 as a required jerk Jreq. Then, at step S9, the torques of the engine 2 and the torque of the second motor 18 are adjusted in such a manner as to achieve the required acceleration Greq set at step S6 and the required jerk Jreq set at step S8. Thereafter, the routine returns.

By contrast, if the required drive force Freq cannot be generated so that the answer of step S7 is NO, the routine progresses to step S10 to set the upper limit acceleration Gwout calculated at step S5 as the required acceleration Greq. Then, at step S11, a corrected jerk Jwout is calculated in such a manner that the driver is allowed to sense same magnitude of the acceleration feeling by establishing the upper limit acceleration Gwout calculated at step S5, as the case that the upper limit acceleration Gwout is equal to or greater than the expected acceleration Gmax.

Magnitude of the acceleration feeling sensed by the driver can be evaluated based on a plateau period of the acceleration and a stimulation intensity. Specifically, the plateau period is a period from a point at which the accelerator pedal is depressed by the driver to a point at which the driver starts sensing a change in the acceleration, and the plateau period includes a control delay time and a response time that varies depending on a type and a grade of the vehicle. On the other hand, the stimulation intensity may be calculated by multiplying a change amount ΔG of the acceleration from a point at which the accelerator pedal is depressed to a point at which the acceleration reaches a target acceleration governed by a position of the accelerator pedal, by an average value of a jerk (as will be simply called the "jerk" hereinafter) during a period of increasing the acceleration to the target acceleration. For example, in order to calculate the stimulation intensity, the change amount ΔG of the acceleration may be raised by predetermined value m, the jerk J may be raised by a predetermined value n, and a product of $\Delta G^m$ and $J^n$ may be multiplied by a predetermined coefficient α, as expressed as:

$$\Sigma \alpha \cdot \Delta G^m \cdot J^n.$$

Thus, the stimulation intensity is calculated as a product of a parameter using the change amount ΔG of the acceleration as a variable and a parameter using the jerk J as a variable. The following example will be explained based on an assumption that the acceleration is evaluated using the stimulation intensity calculated by multiplying the change amount ΔG of the acceleration by the jerk J, for the sake of convenience. In the present disclosure, the parameter using the change amount ΔG of the acceleration as a variable is also called the "acceleration parameter", and the parameter using the jerk J as a variable is also called the "jerk parameter".

Figure 7:
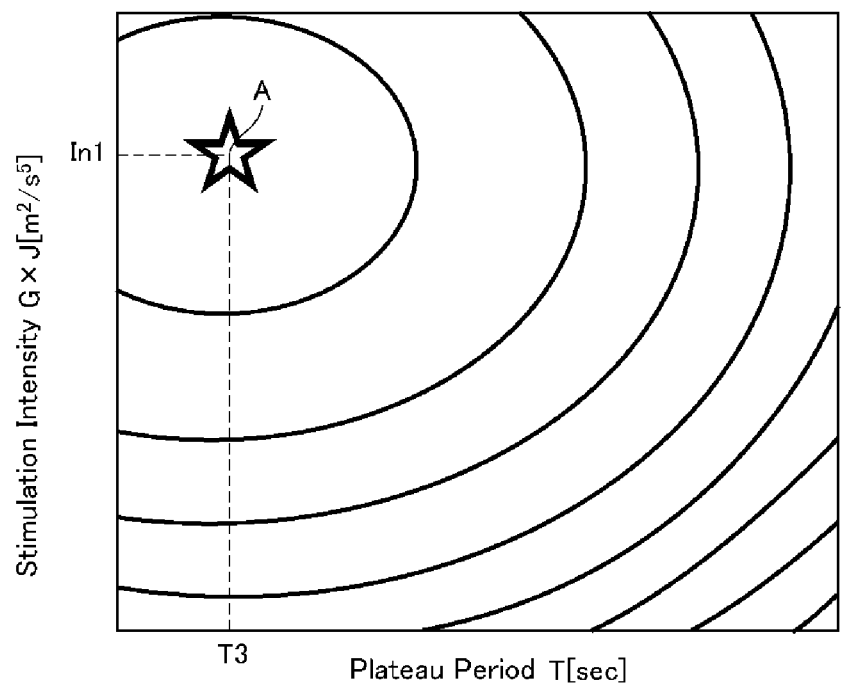
FIG. 7 is an evaluation map for evaluating stimulation intensity at a predetermined vehicle speed.

Turning to FIG. 7, there is shown an example of a map for evaluating the acceleration feeling. In FIG. 7, the horizontal axis represents the plateau period, the vertical axis represents the stimulation intensity, and each level curve indicates a magnitude of the acceleration sensed by the driver. The evaluation map shown in FIG. 7 is prepared based on a result of a sensory test. In the example shown in FIG. 7, the driver is allowed to sense the acceleration most satisfactory at point A given that the plateau period is T3 and that the stimulation intensity is In1, and the acceleration feeling is reduced with a deviation from the point A. That is, given that the plateau period is constant, the driver is allowed to sense same magnitude of the acceleration feeling even if the required drive force Freq cannot be generated, as the case that the required drive force Freq can be generated. In other words, the stimulation intensity of the case that the expected acceleration Gmax calculated at step S3 cannot be established can be equalized to the stimulation intensity of the case that the expected acceleration Gmax calculated at step S3 can be established.

Specifically, the corrected jerk Jwout can be calculated at step S11 using the following formula:

$$Jwout=((Gmax-Gcurrent)\cdot Jopt)/(Gwout-Gcurrent) \quad (3)$$

where Gcurrent is the acceleration when the accelerator pedal is depressed. Accordingly, (Gmax−Gcurrent)·Jopt corresponds to a reference stimulation intensity of the embodiment, and a product of (Gwout−Gcurrent) and Jwout corresponds to a required stimulation intensity of the embodiment. Thus, the corrected jerk is set in such a manner that the required stimulation intensity and the reference stimulation intensity are equalized to each other.

Turning back to FIG. 4, at step S12, the corrected jerk Jwout calculated at step S11 is set as the required jerk Jreq. Then, at step S9, the torques of the engine 2 and the torque of the second motor 18 are adjusted in such a manner as to achieve the required acceleration Greq set at step S10 and the required jerk Jreq set at step S11. Thereafter, the routine returns. In this case, an increasing rate of the torque of the second motor 18 may be changed by changing a time constant used to control the torque of the second motor 18, or by changing an upper limit value of a change rate of the torque. Instead, the torque of the second motor 18 may also be controlled by a feedback method based on a difference between the torque required to establish the required jerk Jreq and the torque of the engine 2, while increasing the torque of the engine 2 at a predetermined rate.

Thus, even if the upper limit acceleration Gwout is less than the expected acceleration Gmax, the jerk J is set in such a manner that the driver is allowed to sense same magnitude of the acceleration feeling as the case that the upper limit acceleration Gwout is equal to or greater than the expected acceleration Gmax. However, in the case that the upper limit acceleration Gwout is less than the expected acceleration Gmax, insufficiency of the acceleration feeling may also be avoided by increasing the jerk greater than the optimum jerk Jopt set in the case that the upper limit acceleration Gwout is equal to or greater than the expected acceleration Gmax. That is, the embodiment of the present disclosure is not limited to correct the jerk in such a manner that the driver is allowed to sense same magnitude of the acceleration feeling as the case that the upper limit acceleration Gwout is equal to or greater than the expected acceleration Gmax, in the case that the upper limit acceleration Gwout is less than the expected acceleration Gmax.

By employing the jerk corrected to be greater than the optimum jerk Jopt as the required jerk, insufficiency of the acceleration feeling may be avoided even if the output power of the electric storage device 21 supplied to the second motor 18 is restricted and hence the upper limit acceleration Gwout is less than the expected acceleration Gmax.

In the case that the upper limit acceleration Gwout is less than the expected acceleration Gmax, if the corrected jerk Jwout is set in such a manner that the driver is allowed to sense same magnitude of the acceleration feeling as the case that the upper limit acceleration Gwout is equal to or greater than the expected acceleration Gmax, the corrected jerk Jwout may exceed the upper limit jerk Jmax shown in FIG. 6. When the corrected jerk Jwout exceeds the upper limit jerk Jmax, the drive force control system according to the embodiment of the present disclosure notifies the driver of a fact that the driver force cannot be generated sufficiently due to e.g., a reduction in the SOC level of the electric storage device 21, by intentionally reducing the stimulation intensity. To this end, the drive force control system according to the embodiment of the present disclosure executes a routine shown in FIG. 8. In the following description, explanations for the steps in common with those in the routine shown in FIG. 4 will be omitted.

Figure 8:
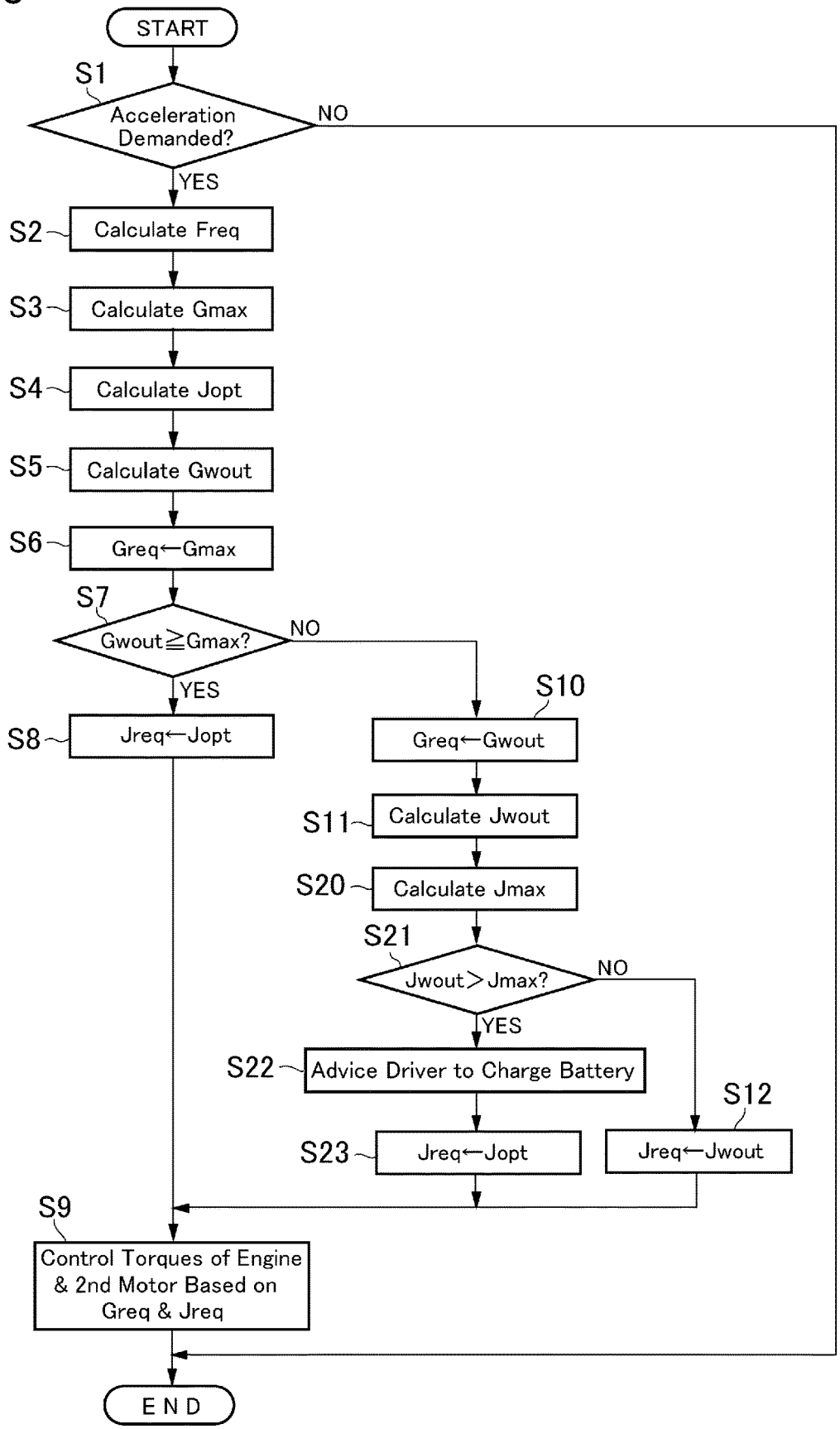
FIG. 8 is a flowchart showing another example of the routine executed by the drive force control system according to the embodiment of the present disclosure.

According to the routine shown in FIG. 8, if the upper limit acceleration Gwout is less than the expected acceleration Gmax due to reduction in the SOC level of the electric storage device 21 so that the answer of step S7 is NO, the routine also progresses to step S10. Then, after calculating the corrected jerk Jwout at step S11, the upper limit jerk Jmax is calculated at step S20 based on a depressing speed of the accelerator pedal while with reference to the map shown in FIG. 6. Then, it is determined at step S21 whether the corrected jerk Jwout calculated at step S11 is greater than the upper limit jerk Jmax calculated at step S20. If the corrected jerk Jwout is less than the upper limit jerk Jmax so that the answer of step S21 is NO, the routine progresses to the aforementioned step S12.

By contrast, if the corrected jerk Jwout is greater than the upper limit jerk Jmax so that the answer of step S21 is YES, the routine progresses to step S22 to notify the driver of the fact that the drive force cannot be generated. At step S22, specifically, the ECU 22 advises the driver to charge the electric storage device 21 by indicating a message on an install panel or by a verbal message.

Then, in order to reduce the stimulation intensity, the optimum jerk Jopt calculated at step S4 is set as the required jerk Jreq at step S23, and the routine progresses to step S9. As described, in the case that the required drive force Freq cannot be generated, the upper limit acceleration Gwout calculated at step S5 is employed as the required acceleration Greq. Therefore, by thus employing the optimum jerk Jopt as the required jerk Jreq, the stimulation intensity is reduced in the amount of reduction in the required acceleration Greq, and hence the acceleration is reduced. As a result, the driver notices insufficiency of the acceleration, and operates the vehicle 1 in such a manner as to charge the electric storage device 21.

Thus, when the SOC level of the electric storage device 21 drops and hence the upper limit acceleration Gwout is less than the expected acceleration Gmax, behavior of the vehicle is changed to allow the driver to notice such reduction in the SOC level. In addition, such reduction in the SOC level of the electric storage device 21 is reported to the driver by the message indicated on the install panel or by the verbal message. For these reasons, the driver is allowed to operate the vehicle 1 in such a manner as to charge the electric storage device 21.

In order not to establish the acceleration intended by the driver, at step S23, the required jerk Jreq may be adjusted within a range between the acceptable upper limit jerk Jmax and the acceptable lower limit jerk Jmin.

What is claimed is:

1. A drive force control system for a vehicle having a motor serving as a prime mover, and an electric storage device that supplies electric power to the motor, comprising:
a controller that controls an output torque of the motor to achieve a required jerk,
wherein the controller is configured to:
calculate an upper limit acceleration possible to be established to accelerate the vehicle based on an upper limit electric power possible to be supplied from the electric storage device to the motor,
set a predetermined reference jerk as the required jerk when the upper limit acceleration is equal to or greater than a target acceleration, and
set a corrected jerk that is greater than the reference jerk as the required jerk when the upper limit acceleration is less than the target acceleration.

2. The drive force control system for the vehicle as claimed in claim 1, wherein the controller is further configured to
set the corrected jerk in such a manner that a required stimulation intensity and a reference stimulation intensity are equalized to each other,
calculate the required stimulation intensity by multiplying acceleration parameter using a change amount of acceleration from a point at which the vehicle is accelerated to a point at which the acceleration reaches the upper limit acceleration, by a jerk parameter using the corrected jerk as a parameter, and
calculate the reference stimulation intensity by multiplying another acceleration parameter using a change amount of the acceleration from the point at which the vehicle is accelerated to a point at which the acceleration reaches the target acceleration, by another jerk parameter using the reference jerk as a parameter.

3. The drive force control system for the vehicle as claimed in claim 2, wherein the controller is further configured to correct the corrected jerk in such a manner that the required stimulation intensity is reduced smaller than the reference stimulation intensity, when the corrected jerk is greater than a predetermined upper limit jerk.

4. The drive force control system for the vehicle as claimed in claim 3, wherein the controller is further configured to correct the corrected jerk less than the upper limit jerk.

5. The drive force control system for the vehicle as claimed in claim 3, wherein the controller is further configured to correct the corrected jerk to the reference jerk.

6. The drive force control system for the vehicle as claimed in claim 3,
wherein the upper limit electric power varies depending on a state of charge level of the electric storage device, and
the controller is further configured to notify a driver of the vehicle to operate the vehicle in such a manner as to charge the electric storage device.

7. The drive force control system for the vehicle as claimed in claim 1,
wherein the prime mover includes an engine, and
the upper limit acceleration includes an acceleration achieved by generating a maximum torque by the engine while generating a maximum torque by the motor.

* * * * *